United States Patent [19]

Farwer

[11] Patent Number: 5,488,216

[45] Date of Patent: Jan. 30, 1996

[54] PROTECTIVE GAS FOR THE LASER WELDING OF ALUMINUM

[75] Inventor: Alfward Farwer, Meerbusch, Germany

[73] Assignee: Messer Griesheim GmbH, Germany

[21] Appl. No.: 288,081

[22] Filed: Aug. 10, 1994

[30] Foreign Application Priority Data

Aug. 30, 1993 [DE] Germany ............... 43 29 127.9

[51] Int. Cl.⁶ .................................................. B23K 26/14
[52] U.S. Cl. ................................. 219/121.64; 219/121.84
[58] Field of Search ........................... 219/121.6, 121.63, 219/121.64, 121.85, 121.84, 121.6, 121.63, 121.64, 121.84, 121.85

[56] References Cited

U.S. PATENT DOCUMENTS

| | | | |
|---|---|---|---|
| 4,000,392 | 12/1976 | Banas et al. ................... | 219/121 LM |
| 4,806,731 | 2/1989 | Bragard et al. ................. | 219/121.69 |
| 4,833,295 | 5/1989 | Locker et al. ................... | 2190/121.63 |
| 4,868,365 | 9/1989 | Farone et al. ................... | 219/121.64 |
| 4,992,643 | 2/1991 | Fuerschbach et al. ........... | 219/121.63 |
| 5,380,976 | 1/1995 | Couch, Jr. et al. .............. | 219/121.44 |

*Primary Examiner*—Teresa J. Walberg
*Assistant Examiner*—J. Pelham
*Attorney, Agent, or Firm*—Connolly & Hutz

[57] ABSTRACT

In the laser welding of aluminum, argon, helium and mixtures thereof are used as protective gases. To improve the welding behavior, 80 vpm to 250 vpm, preferably 120 vpm to 180 vpm of nitrogen, nitrous oxide or nitrogen/nitrous oxide mixture are added to the protective gas.

8 Claims, No Drawings

PROTECTIVE GAS FOR THE LASER WELDING OF ALUMINUM

BACKGROUND OF THE INVENTION

1. Field of the Invention

The invention relates to a protective gas for the laser welding of aluminum.

2. Description of the Prior Art

In the laser welding of aluminum, argon, helium and mixtures thereof are used as protective gases.

Some attempts are also being made to use pure nitrogen, but poor-quality grades cause problems as a result of nitride formation.

Overall, the aluminum laser welding technique is still in the initial stages and the weld appearance is frequently not very satisfactory in comparison to steel welding.

SUMMARY OF THE INVENTION

The object underlying the invention is to create a protective gas based on argon, helium or argon/helium mixtures for the laser welding of aluminum, which protective gas, by the addition of a further component leads to a marked improvement of the welding behavior without metallurgically disadvantageous effects occurring.

DESCRIPTION OF THE PREFERRED EMBODIMENT

Base mixtures having a 50 to 70% helium content have proved to be particularly useful. However, advantageous effects result even in the case of pure argon. Below 80 vpm volume parts per million no further effect can be observed. Above 250 vpm, an impaired weld appearance can result, even if the welding behavior, in comparison with an additive-free protective gas, is still somewhat more favorable. There is also increasingly the risk of impaired-quality weld grades. Although the invention can be practiced with a broad range of 80–250 vmp of the additive gas ($N_2$ or $N_2/N_2O$ mixture) with respect to the primary gas (argon, helium, or argon/helium mixtures), the preferred range is 120–180 vpm with 150 vpm being most preferred.

I claim:

1. A protective gas for the laser welding of aluminum, comprising a primary gas selected from the group consisting of argon, helium and argon/helium mixtures, said primary gas having an addition of 80 vpm to 250 vpm of an additive gas selected from the group consisting of $N_2$, $N_2O$ and $N_2/N_2O$ mixture.

2. The protective gas as claimed in claim 1, having an addition of 120 vpm to 180 vpm of said additive gas.

3. The protective gas as claimed in claim 2, having an addition of 150 vpm of $N_2$, $N_2O$ or $N_2/N_2O$ mixture.

4. A process for the laser welding of aluminum under a protective gas of a primary gas selected from the group consisting of argon, helium and argon/helium mixtures, wherein 80 vpm to 250 vpm of an additive gas selected from the group consisting $N_2$, $N_2O$ and $N_2/N_2O$ mixture are added to the primary gas.

5. The process as claimed in claim 4, wherein 120 vpm to 180 vpm of $N_2$, $N_2O$ or $N_2/N_2O$ mixture are added to the primary gas.

6. The process as claimed in claim 5, wherein 150 vpm of $N_2$, $N_2O$ or $N_2/N_2O$ mixture are added to the primary gas.

7. The process as claimed in claim 4, wherein the additive gas is selected from the group consisting of $N_2O$ and $N_2/N_2O$ mixture.

8. The protective gas as claimed in claim 1, wherein the additive gas is selected from the group consisting of $N_2O$ and $N_2/N_2O$ mixture.

* * * * *